United States Patent [19]

Mozley

[11] Patent Number: 4,669,626

[45] Date of Patent: * Jun. 2, 1987

[54] RUPTURE DISC WITH SELECTIVELY POSITIONED INITIAL BUCKLING

[75] Inventor: Robert M. Mozley, Raytown, Mo.

[73] Assignee: Continental Disc Corporation, Kansas City, Mo.

[*] Notice: The portion of the term of this patent subsequent to Jul. 1, 2003 has been disclaimed.

[21] Appl. No.: 533,982

[22] Filed: Sep. 20, 1983

[51] Int. Cl.⁴ .................. F16K 17/16; F16K 17/40
[52] U.S. Cl. ............................. 220/89 A; 137/68.1
[58] Field of Search .................. 220/89 A, 207; 137/68 R, 68.1

[56] References Cited

U.S. PATENT DOCUMENTS

| | | | |
|---|---|---|---|
| 2,047,049 | 7/1936 | Allen . | |
| 2,225,220 | 12/1940 | Huff | 220/89 A |
| 2,553,267 | 5/1951 | Nedoh | 220/89 A |
| 2,576,431 | 11/1951 | White | 220/89 A |
| 2,586,858 | 2/1952 | Parsons | 220/89 A |
| 2,656,950 | 10/1953 | Coffman | 220/89 A |
| 2,663,458 | 12/1963 | MacGlashan, Jr. | 220/89 A |
| 2,694,503 | 11/1954 | Young et al. | 220/89 A |
| 2,716,506 | 8/1955 | Fike | 220/89 A |
| 2,766,904 | 10/1956 | Phillip | 220/89 A |
| 2,953,279 | 9/1960 | Coffman | 220/89 A |
| 3,005,573 | 10/1961 | Dawson et al. | 220/89 A |
| 3,029,987 | 4/1962 | Gronemeyer | 222/541 |
| 3,039,482 | 6/1962 | Goldberg | 220/89 A |
| 3,087,643 | 4/1963 | Smirra . | |
| 3,091,359 | 5/1963 | Wood | 220/89 A |
| 3,109,553 | 11/1963 | Fike et al. . | |
| 3,109,554 | 11/1963 | Porter et al. | 220/89 A |
| 3,121,509 | 2/1964 | Porter | 220/89 A |
| 3,123,250 | 3/1964 | Lemmer | 220/89 A |
| 3,169,658 | 2/1965 | Porter | 220/89 A |
| 3,195,769 | 7/1965 | Miller | 220/89 A |
| 3,228,334 | 1/1966 | Oss . | |
| 3,257,026 | 6/1966 | Taylor | 220/89 A |
| 3,292,826 | 12/1966 | Abplonolp | 220/89 A X |
| 3,294,277 | 12/1966 | Wood | 220/89 A |
| 3,327,894 | 6/1967 | Ferris | 220/89 A |
| 3,330,440 | 7/1967 | Summers et al. | 220/89 A |
| 3,463,351 | 8/1969 | Mills | 220/89 A |
| 3,478,761 | 11/1969 | Fox | 137/68 R |
| 3,484,817 | 12/1969 | Wood . | |

(List continued on next page.)

FOREIGN PATENT DOCUMENTS

| | | | |
|---|---|---|---|
| 504686 | 7/1954 | Canada | 220/89 A |
| 875337 | 7/1971 | Canada . | |
| 644572 | of 1937 | Fed. Rep. of Germany . | |
| 578008 | 12/1942 | United Kingdom . | |
| 1248872 | 10/1971 | United Kingdom . | |

*Primary Examiner*—Allan N. Shoap
*Attorney, Agent, or Firm*—Litman, Day & McMahon

[57] ABSTRACT

A rupture disc system comprises a rupture disc including a dome portion and a flange portion interconnected by a transition region and a mounting mechanism for mounting the rupture disc by the flange portion thereof in a pressure relieving vent. The rupture disc includes a thickness reducing groove at least partially circumferentially surrounding the dome portion and located in the transition region thereof. Preferably, the rupture disc is of the reverse buckling type and the groove does not completely surround the dome portion so as to define a tab or hinge within that part of the transition region which is ungrooved or not as deeply grooved as a remainder of the transition region. In addition, the slope or radius of curvature may be increased in the region of the tab. The rupture disc also includes an indentation on the dome portion. The indentation is preferably greatest on the dome portion at a location spaced from the transition region and directly between the tab and a crown of the dome portion. In addition, the mounting mechanism includes a lower ring member having an arcuate projection which extends into the vent. Preferably, the arcuate projection is located so as to be relatively close to and so as to align with the tab such that the dome portion wraps about the projection when reverse buckling and rupture occurs. Methods are disclosed for producing the disc with the groove and the indentation.

26 Claims, 35 Drawing Figures

U.S. PATENT DOCUMENTS

| | | | |
|---|---|---|---|
| 3,612,345 | 10/1971 | Fike, Jr. | 220/89 A |
| 3,623,495 | 11/1971 | Erb | 220/89 A X |
| 3,635,234 | 1/1972 | Dawson | 137/68 R |
| 3,658,206 | 4/1972 | Barbier | 220/89 A |
| 3,704,807 | 12/1972 | Lidgard | 220/89 A |
| 3,709,239 | 1/1973 | Morck, Jr. | 137/68 R |
| 3,722,734 | 3/1973 | Raidl, Jr. | 220/89 A |
| 3,777,772 | 12/1973 | Arnold et al. | 137/68 R |
| 3,815,779 | 6/1974 | Ludwig et al. | 220/89 A |
| 3,826,412 | 6/1974 | Zundel | 222/397 |
| 3,831,822 | 8/1974 | Gundel | 220/89 A |
| 3,834,580 | 9/1974 | Ludwig et al. | 220/89 A |
| 3,834,581 | 9/1974 | Solter et al. | 220/89 A |
| 3,845,879 | 11/1974 | Dernbach et al. | 220/89 A |
| 3,857,288 | 12/1974 | Neugebauer | 220/89 A X |
| 3,901,259 | 8/1975 | Banbury | 220/89 A X |
| 3,997,076 | 12/1976 | Jordan | 220/268 |
| 4,043,481 | 8/1977 | Herbst | 220/89 A X |
| 4,059,858 | 11/1977 | Lambel et al. | 137/68 R X |
| 4,072,160 | 2/1978 | Hansen | 220/89 A X |
| 4,073,402 | 2/1978 | Wood | 220/89 A X |
| 4,079,854 | 3/1978 | Shaw et al. | 220/89 A |
| 4,119,236 | 10/1978 | Shaw et al. | 220/89 A |
| 4,122,595 | 10/1978 | Wood et al. | |
| 4,126,184 | 11/1978 | Hinricks | 137/68 R X |
| 4,139,005 | 2/1979 | Dickey | 220/89 B X |
| 4,146,047 | 3/1979 | Wood et al. | 220/89 A X |
| 4,158,422 | 6/1979 | Witten et al. | 220/89 A |
| 4,207,913 | 6/1980 | Fike, Jr. | 220/89 A X |
| 4,211,334 | 7/1980 | Witten et al. | 220/89 A |
| 4,235,347 | 11/1980 | Cothier et al. | 220/89 A |
| 4,236,648 | 12/1980 | Wood et al. | 220/89 A |
| 4,269,214 | 5/1981 | Forsythe et al. | 220/89 A X |
| 4,278,181 | 7/1981 | Wood et al. | 220/89 A |
| 4,301,938 | 11/1981 | Wood et al. | 220/89 A |
| 4,342,988 | 8/1982 | Thompson et al. | 220/89 A X |
| 4,347,942 | 9/1982 | Jernberg et al. | 220/89 A |
| 4,385,710 | 5/1983 | Kurihara et al. | 220/89 A |
| 4,394,926 | 7/1983 | Ou et al. | 220/89 A |
| 4,416,388 | 11/1983 | Mulawski | 220/89 A |
| 4,432,791 | 2/1984 | Mulawski | 220/89 A |
| 4,513,874 | 4/1985 | Mulawski | 220/89 A |

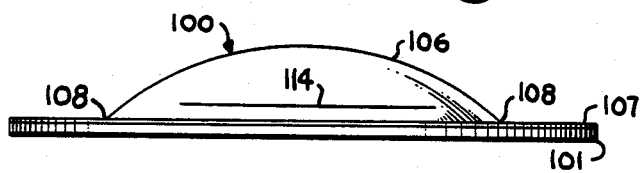
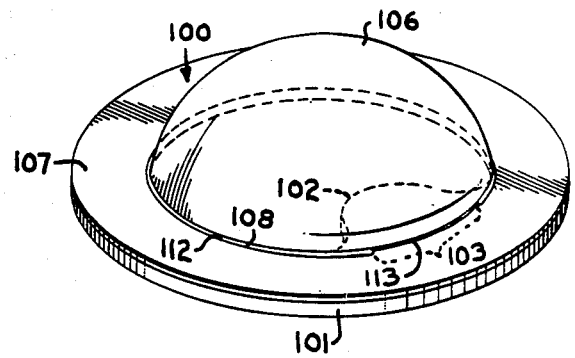
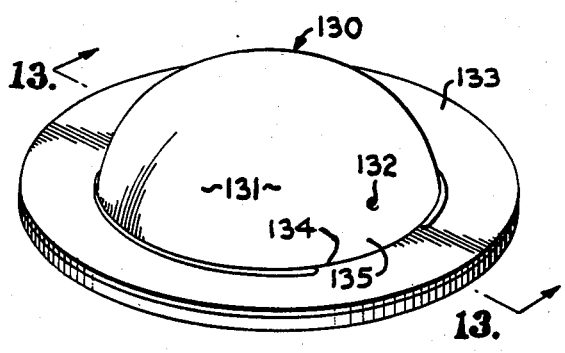
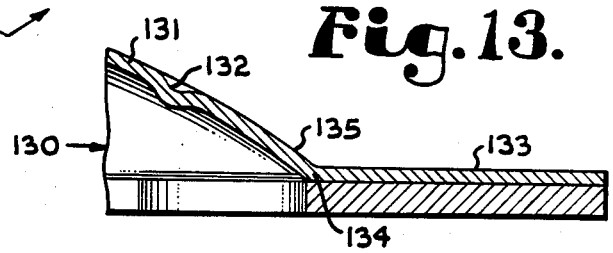
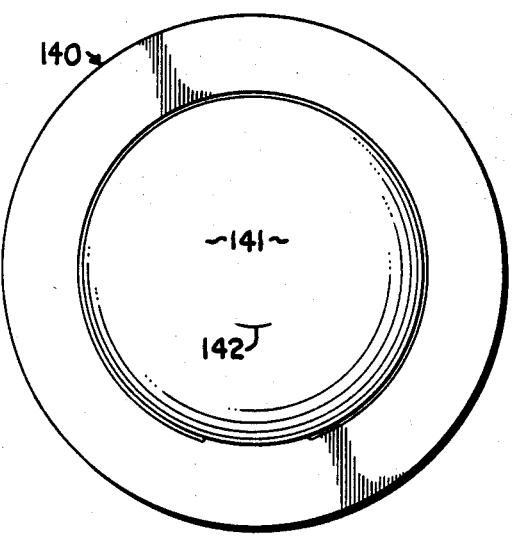
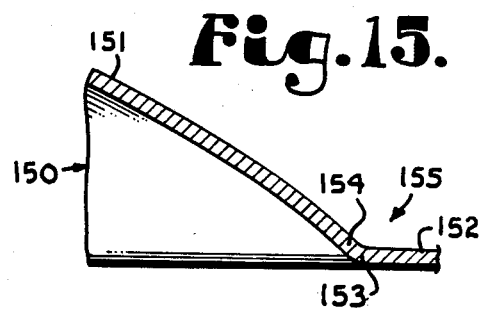

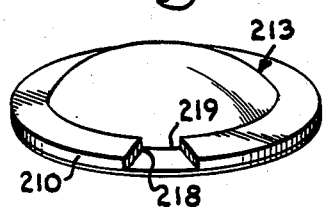
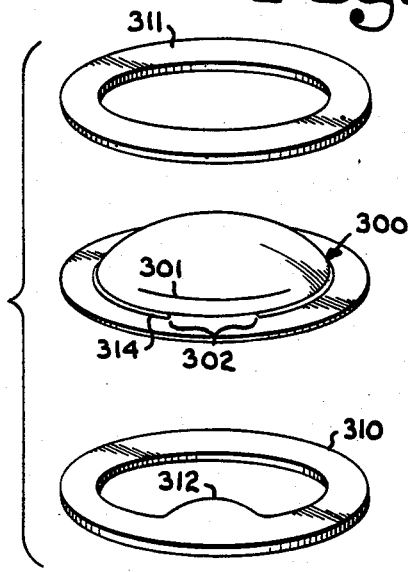
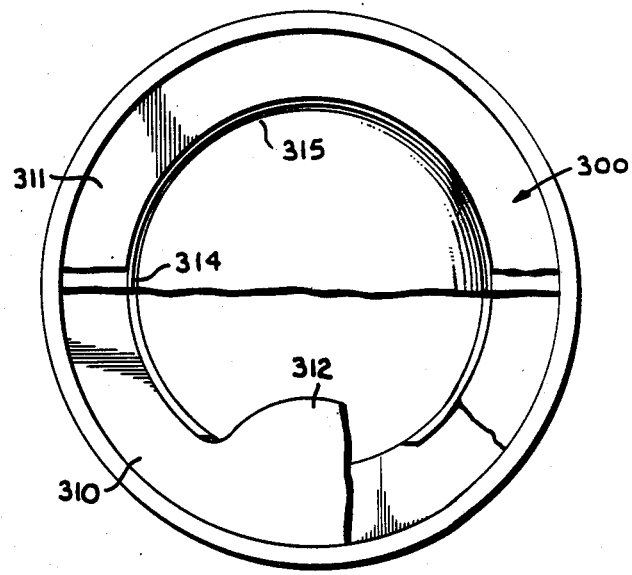
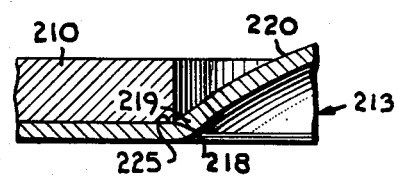
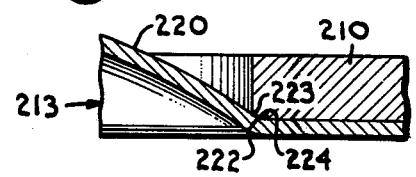
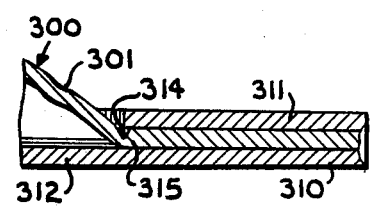

RUPTURE DISC WITH SELECTIVELY POSITIONED INITIAL BUCKLING

BACKGROUND OF THE INVENTION

The present invention relates to safety pressure relief devices and, in particular, to rupture discs, especially reverse buckling rupture discs, and also to methods of manufacturing such discs and of producing failures in such discs which are highly predictable.

Relief devices of the type commonly known as rupture discs have been utilized by industry for many years to provide a safety mechanism to relieve excessive pressure from an overpressurized system or vessel in a reliable manner. The rupture disc is most frequently placed in a vent for a pressure vessel or the like so as to prevent flow of fluid through the vent until the disc ruptures. Through the years, numerous improvements have been made in the rupture disc concept in order to reduce the cost and to improve the reliability of the disc.

A specific type of disc normally referred to as a reverse buckling rupture disc has also been utilized for a number of years and functions under the principle that a dome is formed in the disc which is positioned in the vent such that the dome points toward or faces the pressure side of the vent, that is, the convex side of the dome faces the internal portion or upstream side of the vent wherein pressurized fluid is likely to produce an overpressure which would be dangerous or destructive if not relieved. One advantage of reverse buckling type discs is that systems being protected by the discs can be operated at pressures relatively close to the bursting pressure of the disc without producing fatigue and failure which occurs in many forward bursting discs when operated for long periods of time near the rated bursting pressure of such discs. The dome, when fluid pressure reaches a preselected pressure for which the dome was designed to rupture, starts to collapse, that is, the column or arch of the dome on one side thereof starts to buckle. It is believed that as the arch on one side of the dome starts to collapse, a buckling type wave typically propagates across the surface of the dome to the opposite side of the dome where total collapse eventually occurs. This buckling wave tends to create a whiplash effect on this opposite side of the dome so that the dome at this location is rather violently urged in the direction to which the concave portion of the dome faces (that is, the downstream side of the vent). Many of the reverse buckling rupture discs include knife blades positioned on the concave side of the dome which are normally in spaced relationship to the dome but which are engaged by the dome upon buckling. The knives cut the dome, typically in such a pattern as to cause petals which are held to a flange portion of the disc by tab regions or the like.

Knife blade assemblies for reverse buckling rupture discs add substantially to the cost of such discs and are subject to failure due to corrosive activities of the fluids within the vent system, damage during handling or simply because a mechanic forgets to install the knife assembly which in normal discs results in disc bursting pressures that are many times the rated pressures of such discs. It has, therefore, been a goal of the rupture disc industry to produce a disc of the reverse buckling type which does not include knife assemblies, but which is highly reliable. One reverse buckling rupture disc, which was specifically designed to rupture without the use of knife blades, incorporates the concept of placing grooves, scores or etchings, especially in criss-cross or circular patterns on concave or convex faces of a reverse buckling rupture disc dome. A dome of this type can be seen in U.S. Pat. No. 3,484,817 of Wood. In the Wood device the rupture disc dome buckles, reverses and fractures along the lines of weakness produced by the grooves so as to form petals which are held to the remainder of the rupture disc assembly.

There has been a continuing desire in the rupture disc industry to produce new types of reverse buckling rupture discs which have properties that make them especially suitable for specific purposes, more cost efficient, and/or make the disc more reliable. In particular, new reverse buckling rupture discs are desired which will function without the need for knife blades for cutting the disc on reversal, yet which will remain highly reliable so as to relieve within a relatively close tolerance of the predetermined rupture pressure necessary to protect the vessels or the like which are protected by the disc.

There has also been a problem associated with some reverse buckling rupture discs which do not have knife blade assemblies in that the disc can accidentally be inserted into the vent system with the concave side facing in the wrong direction. Therefore, it is important that the rupture disc relieve in either direction, although the relief in the backward direction may normally be at a higher pressure.

There is also a problem in some systems with portions of the rupture disc being entrained with the fluid being relieved. Pieces of rupture discs can cause damage to pumps and the like if they are allowed to freely break away from the remainder of the rupture disc assembly upon rupture. Therefore, it is important that the rupture disc dome or petals of the rupture disc dome remain intact after rupture and that they remain attached to a remainder of the disc.

OBJECTS OF THE INVENTION

Therefore, the principal objects of the present invention are: to provide a rupture disc system which is highly reliable such that the rupture disc associated with the system ruptures within a relatively close range on either side of a preselected pressure to protect a vessel or the like from overpressure; to provide such a system including a reverse buckling rupture disc which does not require a knife assembly to open; to provide such a reverse buckling rupture disc which will reliably rupture at a first given pressure when fluid pressure is applied to the convex side thereof and at a second given pressure, for example 1.5 times the first given pressure, when fluid pressure is applied to the concave side thereof; to provide such a rupture disc including hinge or tab means for retaining the disc or portions of the disc with the remainder of the rupture disc assembly after rupture of the disc; to provide a structural configuration of the disc which ensures that the disc will first fail on the side of the disc associated with the hinge or tab and therefore first tear between a dome and flange portion of the disc opposite such hinge or tab and thereafter tear to the edge of said tab leaving the hinge or tab intact; to provide such a disc having indentations or dimples spaced from the hinge or tab region in the dome, especially on the dome directly and between the tab region and a crown of the dome, so as to initially trigger failure or buckling of the rupture disc adjacent to the tab or hinge; to provide such a reverse buckling rupture disc having a change in radius in a transition region between the disc dome and flange portions adjacent the tab or hinge region so as to ensure initial failure or buckling of the disc in the region of the dome directly between the tab region and the dome crown; to provide such a disc utilizing an arcuate projection into the vent assembly opposite the concave side of such disc and spaced closely adjacent the hinge or tab region of the disc for the dome to wrap about after rupture thereof; to provide such a disc having a groove or etching in the transition region between the dome and the flange portion of the disc; to provide such a groove or etching which is approximately two-thirds the depth of the transition region; to provide such a disc having a groove which extends only partially about the transition region and defines the tab or hinge region thereof within the portion of the transition region wherein the grooving or etching does not occur; to provide such a system including support rings on either side of the flange portion of the rupture disc which cooperate with the disc to ensure that the grooved area in the transition region is supported on the concave or downstream side of the rupture disc dome and that the rupture disc is also free to fracture toward the convex side thereof without being held in place or restricted from buckling by the support ring on that side after rupture; to provide a method of manufacturing such a rupture disc having a groove in the transition region including a method and apparatus for producing the groove; to provide a method for forming an indentation on the side of the rupture disc dome associated with a hinge or tab; to provide a method of producing a rupture disc of the type described having a transition region with a portion thereof associated with a tab region having a greater radius than the remainder thereof, so as to provide a first buckling area, in the tab region; to provide a method of placing a continuous circular groove in the transition region between a dome and a flange portion of the rupture disc with varying depths so as to define a tab region; and to provide an overall rupture disc system which is relatively economical to manufacture, convenient to install, highly reliable, and particulary well adapted for the intended usage thereof.

Other objects and advantages of this invention will become apparent from the following description taken in conjunction with the accompanying drawings wherein are set forth, by way of illustration and example, certain embodiments of this invention.

SUMMARY OF THE INVENTION

A rupture disc assembly is provided which includes a domed or pre-bulged rupture disc of the type utilized to protect pressure vessels or the like from over pressure. The rupture disc is preferably a reverse buckling disc, but certain of the improvements discussed hereinafter may be utilized in conjunction with a conventional forwardly opening disc. The improvements discussed herein derive from experimentation directed to finding a rupture disc which would not only relieve at a preselected pressure (normally the preselected pressure is approximately ⅔ of the maximum rated rupture pressure associated with the vessel or other processing equipment to be protected by the disc), but also would relieve at a second preselected pressure, if the rupture disc were inadvertently installed backward (such second pressure for example being approximately the maximum rated pressure of the vessel, again for example, at a pressure 1.5 times the first preselected pressure).

It was especially desired to produce a reliable reverse buckling rupture disc which would predictably rupture at such a first preselected pressure, and which would also rupture at said second preselected pressure if the disc were inadvertently placed in the vent line backward, and further that the disc should rupture without the aid of a knife assembly as knife assemblies are expensive and may be susceptible to corrosion, damage, and the like which produces failure in such knives or the knife blades may be accidentally left out of the assembly during installation.

With this in mind, numerous structures were tested but failed to have the predictable rupture pressures required of such devices. Contrary to conventional thought in the rupture disc industry against making any modifications in the region of the reverse buckling rupture disc between dome and flange portions (normally referred to as a transition area or region), other than to change the radius thereof, it was discovered that placing of a groove within the transition area produced suitable and highly repeatable release pressures in either direction.

A full circle groove in the transition area of a reverse buckling rupture disc produced highly repeatable results when the groove was manufactured in a consistent fashion. It is noted that the groove may affect the bursting pressure of the disc as compared to the disc before the groove is added, however, the important result with the groove as with other improvements discussed herein, is that the bursting pressure be consistently reproduceable in successive discs which are modified or produced in the same manner.

It was found that a satisfactory groove could be made by placing a die with a knife edge under pressure against the transition area and allowing the knife edge to penetrate the area. It was found that a particular knife blade had to be tested with each different disc to see if that blade was compatible with the disc. For example, flatter or oval edged knife blades were found to be suitable for discs which are thicker, while more V-shaped knife blades with a radius from about 0.003 to 0.015 inches on the edge were found to be better for relatively thinner discs. One suitable V-shaped knife blade for certain rupture discs was found to be a blade having in cross section a central axis which is perpendicularly aligned with the surface of the flange portion of the disc when forming the groove, sides of the blade which diverge generally from the central axis and specifically from a point or knife edge at angles of approximately thirty degrees, and an edge which has a radius of approximately 0.005 inches. The radially inner side of the knife blade is preferably placed close to or adjacent the domed portion of the disc and it is not unusual for the radius of curvature of the dome at its juncture with the transition region to change during manufacture of the groove. While the exact depth of penetration of the knife blade into the transition area varies with the desired bursting pressure in each direction, thickness of the disc and with materials of construction, it was found in some discs that a groove depth of approximately two-thirds the thickness of the transition area is often quite suitable for producing the effect of bursting at the first preselected pressure in one direction and bursting at a pressure approximately 1.5 times the first preselected pressure in the opposite direction, if the disc were inadvertently installed backward. A groove depth of 40 to 50% of the disc normal thickness was often found to be sufficient to produce tearing upon buckling in most discs. However, it is specifically noted that depths of the groove cited herein are for purposes of example and that the depth required for a certain disc (that is a specific disc having a fixed thickness, material of construction, temper, etc.) to relieve at a certain pressure can only best be determined by experimentation. It is important that the reverse buckling rupture disc with the groove in the transition area be supported on the downstream side thereof (that is, on the side of the disc where fluid pressure would normally not be applied and also on what would normally be the concave side of the dome portion of the disc). The structure supporting the rupture disc in this manner preferably extends along substantially the entire portion of the transition area, especially where grooved. When reference is made herein to the groove being "in the transition area", it is meant that it is placed on the disc in such a manner as it would at least touch the original transition area. Actually, a modified transition region is normally formed when the groove is placed on the disc.

While the full circle grooving in the transition region works well for reverse buckling rupture discs wherein it does not matter if fragments of the ruptured disc are carried downstream in the vent line after the rupture disc bursts, it is often desirable to retain the rupture disc as an integral, although ruptured, unit even after bursting. For this, a hinge or tab is placed between the dome portion and the flange portion of the rupture disc. One method to provide such a tab, is that grooving is applied to the transition region in a partial circumferential manner so as to define such a tab region by that portion of the transition region which has not been grooved. For example, a thirty degree arc of the transition region may be left ungrooved while a continuous 330 degree remaining arc is grooved. Tabs of larger and smaller area have been found to be functional and the optimum tab arc depends on the particular disc.

While producing a tab region by not grooving a certain portion of the disc on the transition region functions well for certain discs and utilizations, it is found that normally the larger the ungrooved area, then the more unpredictable the bursting pressure of the disc becomes. In addition, in certain discs the violence of the rupture will cause a tear through such a tab region. It was found that a disc with a more reliable bursting pressure and yet with a tab region could be manufactured by utilizing a die with a generally continuous or full 360 degree arc knife, by changing the characteristics of the knife in the region desired to be left as a tab.

In particular, a portion of the knife edge is removed corresponding to the desired size of the tab, such that during the grooving process the knife does not form a groove in that portion where the edge is modified or at least does not form as deep a groove in the projected tab portion. The knife blade does apparently change the radius of curvature of the transition region adjacent the projected tab area even though it is not as deeply grooved, if at all; and, while applicant does not wish to be restricted to a certain theory of operation, it is believed that this change in radius modifies the characteristics of the disc in such a manner as to produce a disc which relieves at a more predictable pressure. Preferably, the knife blade is placed on the disc flange portion upstream flat surface next to the dome portion, and thereafter pressure is applied to the blade to urge it to penetrate into the flange portion along the transition region and, in particular, in a manner so as to penetrate generally perpendicular to the flat sides of the flange portion. It is noted that the maximum depth of penetration of the knife blade in the transition region is preferably accurately controlled by use of stops or the like.

It is generally believed in the industry that reverse buckling rupture discs tend to collapse or buckle on one side of the dome at which time a buckling type wave propagates out over the top of the dome to the opposite side of the dome. As the wave hits the opposite side of the dome there is a whiplash effect which violently thrusts the side of the dome associated with such whiplash in a downstream direction and tears the dome from the flange portion, which tear then propogates back around the disc to the side where the buckling first occurred. This whiplash buckling effect is often sufficiently strong to break the tab region of the rupture disc, if failure of the disc first occurs opposite such tab. Therefore, in order to provide even more reliability to the tab in order to prevent fragmentation of the disc, it is desired to first initiate failure of the disc in the tab region so that the whiplash effect will occur opposite the tab region.

A suitable technique for inducing failure of the disc first in the area of the dome in close association with the tab region has been found to comprise substantially modifying the radius of curvature of the transition area adjacent (that is coextensive with) the tab region or adjacent a portion of the tab region. Pre-bulged rupture discs are often manufactured by applying fluid pressure to one side of a flat plate of sheet metal stock while supporting the opposite side of the stock against a forming ring, the interior diameter of the forming ring defines the chordal diameter of the dome of the disc to be formed in the plane of the projected flange portion. The disc thus domes up through the forming ring. The edge of the forming ring is normally a fairly sharp 90 degree angle which forms a specific radius of curvature at the transition area. By breaking or rounding the radially internal edge of the ring where it engages the disc with a whetstone or the like, the radius of curvature of the transition area of the resulting rupture disc varies where such rounding occurs in the forming ring as compared to where no rounding has occurred. In this way the radius of curvature can be increased along that portion of the transition area of the disc associated with the tab region to ensure initial failure of the dome in close proximity to the tab region (especially on an arc of the dome which is centered on the tab region and extends to near the dome crown).

A second method has also been found for inducing the initial failure of the dome at or relatively near a selected location. This second method comprises placement of a dent, dimple, or other deformation, which will generally be referred to herein as an indentation, in the dome itself at a location spaced from the transition region and further in spaced relationship to the crown of the rupture disc but in close proximity to the projected tab region. Preferably, the center of the indentation is directly on an arc of the dome extending between the top or crown of the dome and the tab region, that is located on the dome on an arc directly connecting the center of the tab with the dome crown. Such an indentation may take the form of a dot, an elongate chord or arc running generally parallel to the transition region of the disc, a series of dots or lines defining indentations, or the like. It has been found that the failure of the dome may occur anywhere along the indentation; therefore, a relatively short indentation, for example not exceeding thirty degrees in arc, may be desirable for certain applications but larger indentations do function to ensure failure somewhere along the indentation. It is preferred that the indentation not substantially reduce the wall thickness of the dome and that it be placed unsymmetrically with respect to the dome. The height of the placement of the indentation relative to the overall height of the dome may vary in accordance with the desired failure pressure (typically, the closer to the crown, the greater reduction in rupture pressure for a particular disc). A suitable height for an indentation has been found to be, for example, approximately 0.06 inches from the transition region for some discs. Again optimum shape and placement of the indentation for a particular disc is found by testing.

Suitable indentations can be produced in the dome by placing an edge or point against the dome at the desired location while applying pressure to the opposite side of the dome. This can advantageously be accomplished in conjunction with the pre-bulging of the disc. In particular, a second indentation ring may be used adjacent the bulge forming ring which forming ring defines the perimeter of the dome during formation thereof. Such an indentation ring rests atop the bulge forming ring and has an edge or point against which the dome is urged during formation thereof. Spacing of the indentation ring from the flange portion is controlled by the thickness of the forming ring. Suitable types of rings have been found to include a circular ring which has the same interior diameter as but is slightly non-concentrically aligned with the bulge forming ring so as to place a dent in the dome at the location above or in close association with the projected tab region. Other rings include those concentrically aligning with the bulge forming ring but having a curved or linear edge on the radially inner side of a projection extending radially inwardly from the ring. It has been found that the relief pressure of the disc varies significantly with which type of indentation ring is utilized so again testing must be used to find the relief pressure of a given disc with a specific indentation, but, if all factors remain the same for consecutive discs, then each should relieve at the same pressure. The indentation can also be formed in a procedure separate from the pre-bulging procedure.

Finally, it has been found that the force associated with rupture of certain discs will tear the tab region, even when initial failure of the disc is on the side of the dome associated with the tab region. It has been found that, if an arcuate projection extending radially inward from the side of the vent below the tab region is provided for the dome to wrap about upon rupture while the tab is still intact, then the tab region is less likely to tear. When it is indicated herein that the projection is below or aligned with the tab region, it is meant that the projection should be downstream in the vent relative to the unruptured disc, on the concave side of the rupture disc prior to rupture, and could refer to such a projection which was actually spacially "above" the disc but still downstream from same. In particular, the projection should be aligned such that as the dome pivots about, the hinge formed by the tab region upon rupture, the dome engages the projection. Projections which have a linear or chordal engaging surface have been previously used in the art, but have been found to sometimes allow the dome to continue to rip along the tab region and, therefore, were not generally found to be satisfactory for the disc described herein. On the other hand, projections which are relatively arcuate in nature and project radially inward from the side of the vent, especially those that are almost circular or nearly approximating the curvature of the dome were found to be most suitable.

A suitable projection for certain uses was found to be one that is generally flat on sides thereof facing toward and away from the rupture disc prior to bursting and which has the facing surface in a plane which is generally adjacent a plane defined by the downstream side of the flange portion. Further, the example projection has a thickness of approximately 0.060 inches, has a radially inwardly projecting edge which is almost circular, and has a radius roughly between one-fourth and one-fifth the radius of the inner diameter of the disc flange portion. The example projection being attached to and extending along a downstream support ring for the disc through an arc length which is preferably slightly longer than the arc length associated with the tab region. For example, if the arc of the tab region is approximately 30 degrees, then the projection would extend for an arc of approximately 34 degrees. In this manner, the transition area of the disc tears along the groove upon rupture to the tab region and such that the edges of the dome next to the tab region do not align exactly with the projection but tend to wrap thereabout so as to further secure the ruptured dome to the projection until a maintenance crew can change the disc.

While the improvements discussed above have been described especially in terms of reverse buckling rupture discs, certain features of the improvements can be utilized in conjunction with other types of conventional rupture discs. In particular, it is foreseen that a circumferential groove may be utilized in a transition region of a conventional forward failure rupture pre-bulged disc to allow a failure if the disc is inserted backward and may be utilized in conjunction with typical grooves, slits or other devices on the dome of such forward acting disc which grooves, etc. cause failure in a normal forward direction.

It is noted that in some of the drawings, the scale of certain features has been exaggerated, where necessary, in order to show details thereof. This is especially true of the thickness of the various rupture discs relative to the assembly associated therewith. The drawings constitute a part of this specification and include exemplary embodiments of the present invention and illustrate various objects and features thereof.

BRIEF DESCRIPTION OF THE DRAWINGS

FIG. 10 is a side elevational view of the first modified rupture disc.

FIG. 11 is a perspective view of the first modified rupture disc and support ring thereof showing details of the disc and ring in phantom.

FIG. 12 is a perspective view of a second modified rupture disc and support ring therefor for use in the rupture disc assembly shown in FIG. 1.

FIG. 13 is an enlarged fragmentary cross-sectional view of the second modified rupture disc and support ring taken along line 13—13 of FIG. 12.

FIG. 14 is a top plan view showing a third modified rupture disc for use in conjunction with the rupture disc assembly of FIG. 1.

FIG. 15 is an enlarged fragmentary cross-sectional view of a fourth modified rupture disc for use in the rupture disc assembly of FIG. 1.

FIG. 16 is a perspective view at a reduced scale of a planar blank of material to be formed into a reverse buckling rupture disc according to the present invention.

FIG. 17 is a perspective view showing a reverse buckling rupture disc produced from the blank of FIG. 16 just following the formation of a bulge at a central portion of the disc and showing a die ring through which the bulge is formed with portions of the ring broken away to show detail thereof.

FIG. 21 is an enlarged fragmentary cross-sectional view of a reverse buckling disc during a step in a manufacturing process wherein the dome of the disc is urged upward through a forming ring.

FIG. 22 is a view similar to FIG. 21 at a different location around the ring and showing a change in the radius of the transition area associated with the rupture disc.

FIG. 23 is an exploded perspective view at a reduced scale of a rupture disc with upper and lower supporting rings during another step in the process of manufacturing of an assembly such as is shown in FIG. 1.

FIG. 24 is an enlarged fragmentary cross-sectional view of the rupture disc and the support rings of FIG. 23 after spot welding same together.

FIG. 26 is a top plan view of the rupture disc and ring assembly shown in FIG. 23 with portions broken away to show detail thereof.

FIG. 28a is a top plan view showing a fifth modified rupture disc having an indentation formed thereon by the ringlet set shown in FIG. 27a.

FIG. 30 is a cross-sectional view of a rupture disc similar to the disc shown in FIG. 29 but having an indentation formed thereon by the ringlet set of FIG. 27a.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
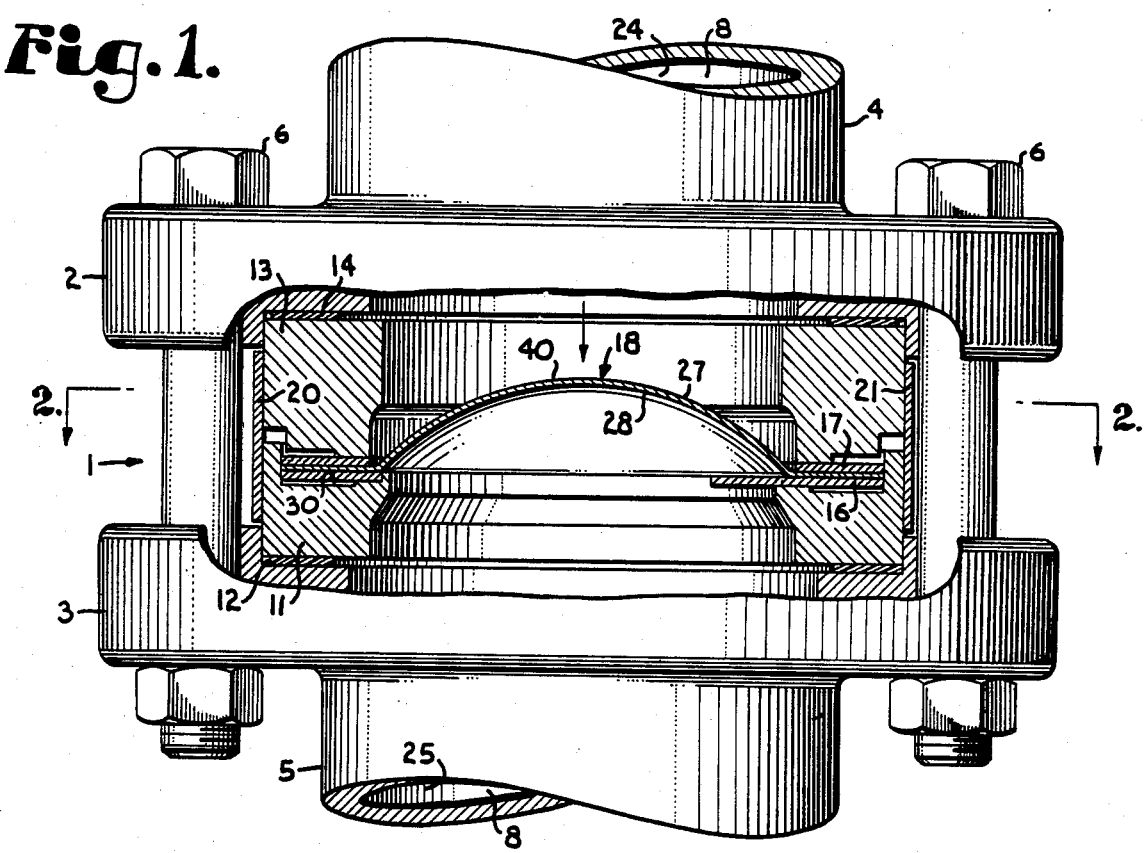
FIG. 1 is a side elevational view of a rupture disc assembly according to the present invention installed in a vent pipe between support rings with portions broken away to illustrate details of the assembly.
Figure 2:
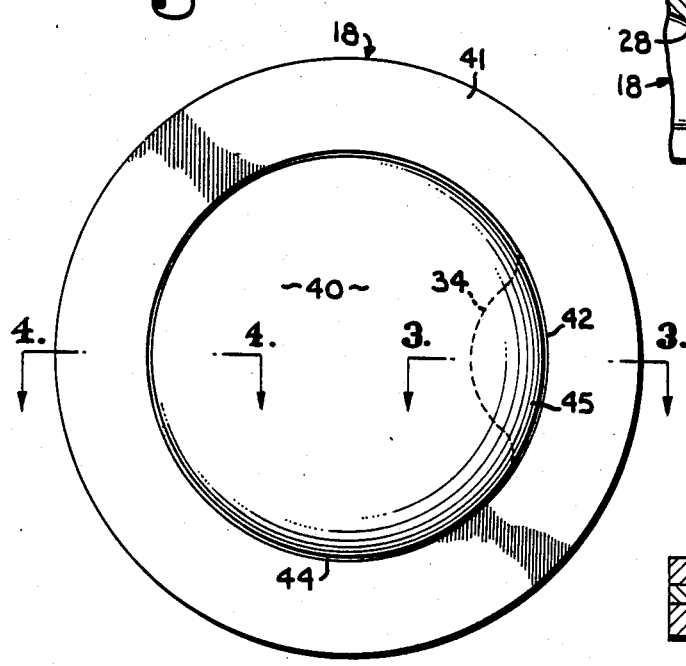
FIG. 2 is a top plan view of the rupture disc and support rings of FIG. 1 with portions of the lower support ring shown in phantom.
Figure 5:
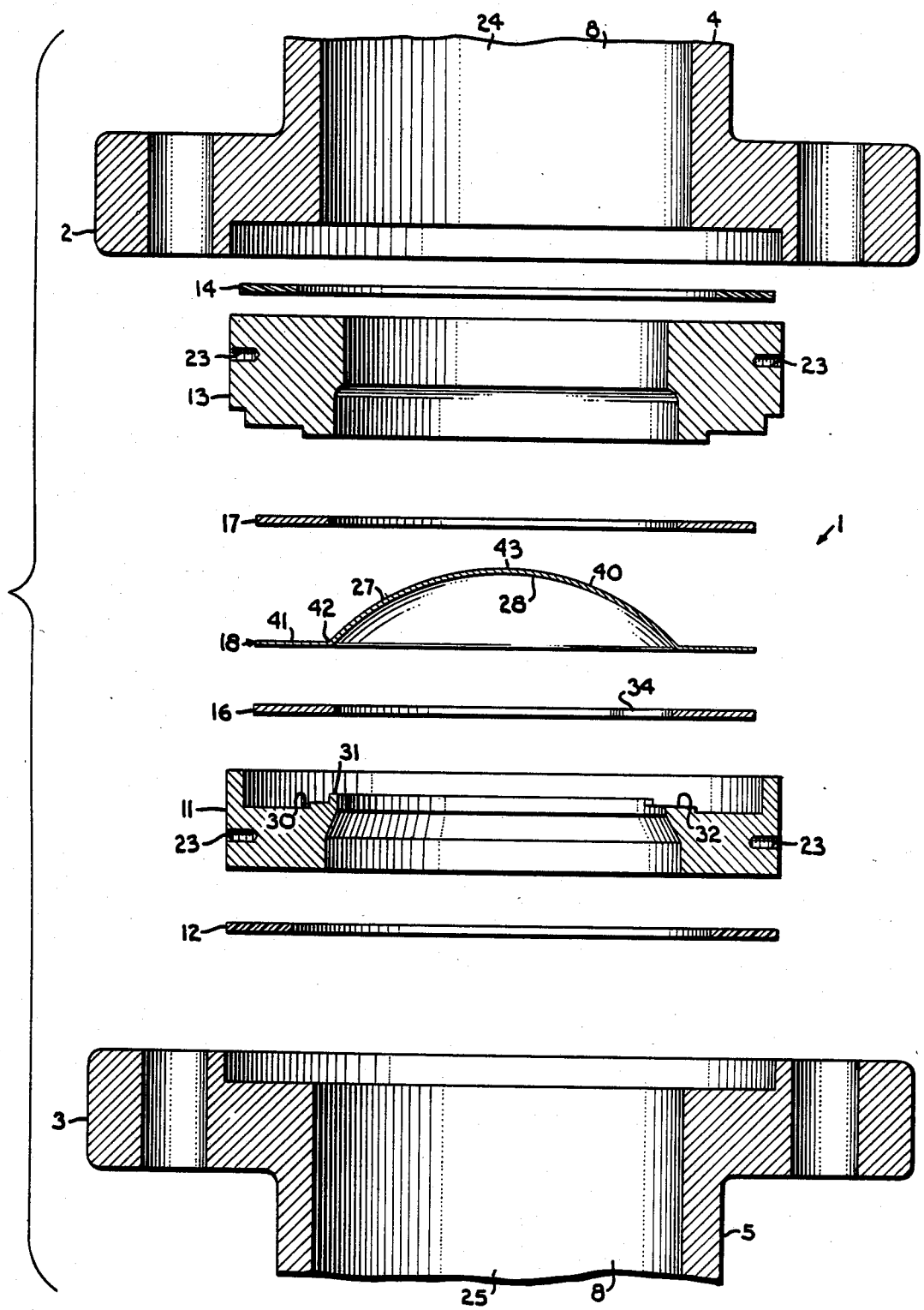
FIG. 5 is an exploded cross-sectional view of the assembly shown in FIG. 1.

The reference numeral 1 generally designates a safety pressure relief assembly according to the present invention. The assembly 1, as is best seen in FIG. 1 and in the exploded view in FIG. 5, is secured between opposite flanges 2 and 3 which are end flanges of vent pipe sections 4 and 5 respectively and which are securely held together so as to clamp the assembly 1 therebetween by a plurality of circumferentially spaced bolts 6. The vent pipe sections 4 and 5 form part of a vent system including an interior channel 8. The vent system includes an upstream portion which is associated with vent pipe section 4 and which joins with a pressure vessel or the like (not shown) to be protected by the vent system and would also normally be the side of the vent system to be positively pressurized by fluid therein. Vent pipe section 5 discharges to a safe location (not shown) to relieve excess pressure communicating therewith from vent pipe section 4 upon relief by the assembly 1. The assembly 1 comprises a downstream support structure 11 (FIG. 5), a downstream seal member 12, an upstream support structure 13, and an upstream seal member 14. The assembly 1 further comprises a downstream support ring 16, an upstream support ring 17, and a reverse buckling rupture disc 18.

When the assembly 1 is in use, seal member 14, the support structure 13, the support ring 17, the rupture disc 18, the support ring 16, the support structure 11, and seal member 12 are in sequential, abutting and snug relationship with respect to one another so as to be generally resistant to fluid pressure leaks in a radially outward direction, this configuration being shown in FIG. 1. The assembly 1 is retained together by keeper brackets 20 and 21 which are secured to both of the support structures 11 and 13 by suitable bolts (not shown) or the like received in threaded apertures 23. There is a generally unrestricted upstream channel portion 24 extending from the upstream or convex side 27 of the rupture disc 18 to the vessel or the like being protected by the assembly 1 and a generally unrestricted downstream channel portion 25 extending from a downstream or concave side 28 of the rupture disc 18. The downstream support structure 11 includes an annular seat 30 for the support ring 16 and further includes an annular boss 31 which is positioned radially inward from the seat 30. The boss 31 extends circumferentially in conjunction with the seat 30 except for a sector 32 of the seat which angularly aligns with an arcuate projection 34 on the support ring 16.

Attention is directed to the support rings 16 and 17 and the rupture disc 18, such as are shown in greater detail in FIGS. 2, 3, 4 and 6. The rupture disc 18 is of the type commonly referred to as a reverse buckling rupture disc having a central pre-bulged dome 40, a generally planar flange portion 41 which extends radially outward from a periphery of the dome 40, and a transition area or region 42 between the dome 40 and the flange portion 41. The dome 40 has the disc convex side 27 and concave side 28 thereon, an apex or crown 43 and has a generally uniform thickness, although the thickness normally varies somewhat due to variances induced during the pre-bulging of the dome 40.

The rupture disc 18 further includes a semi-circular groove 44 which is in the transition region 42. A portion of the transition region 42 generally indicated by the reference numeral 45 does not include a groove therein and is a projected or designated hinge or tab region for the rupture disc 18 at the time of bursting. That is, upon bursting it is desired that the dome 40 tear away from the flange portion 41 along the groove 44 and that portion of the transition region 42 which is coextensive with the groove 44, while preferably the tab region 45 remains intact or untorn.

Figure 3:
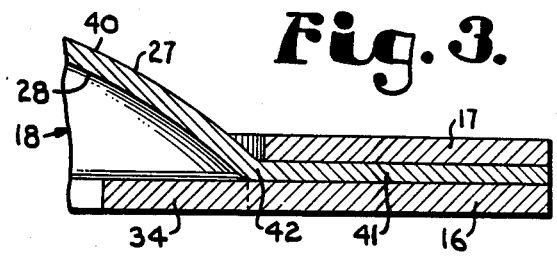
FIG. 3 is an enlarged, fragmentary cross-sectional view of the rupture disc and support rings taken along line 3—3 of FIG. 2.
Figure 4:
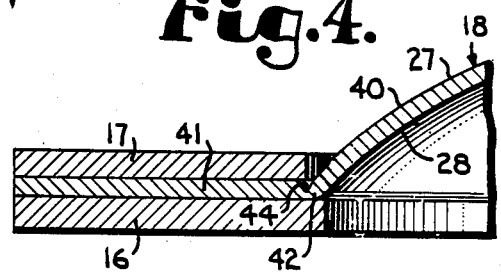
FIG. 4 is an enlarged, fragmentary cross-sectional view of the rupture disc and support rings taken along line 4—4 of FIG. 2.
Figure 6:
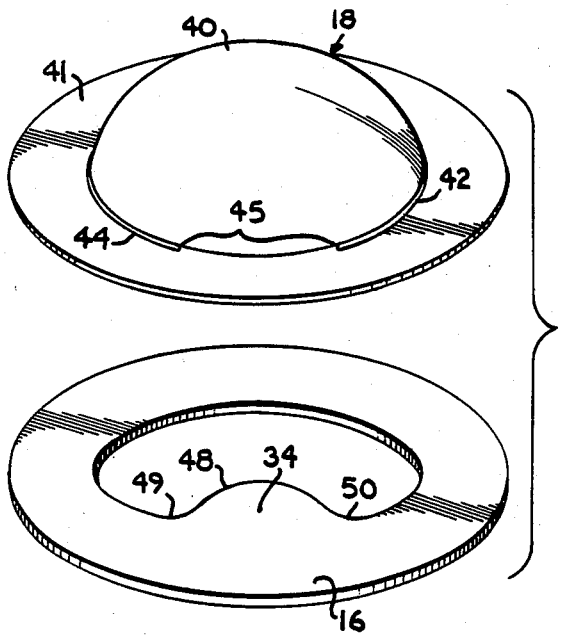
FIG. 6 is a separated perspective view of the rupture disc and the lower support ring at a reduced scale.
Figure 7:
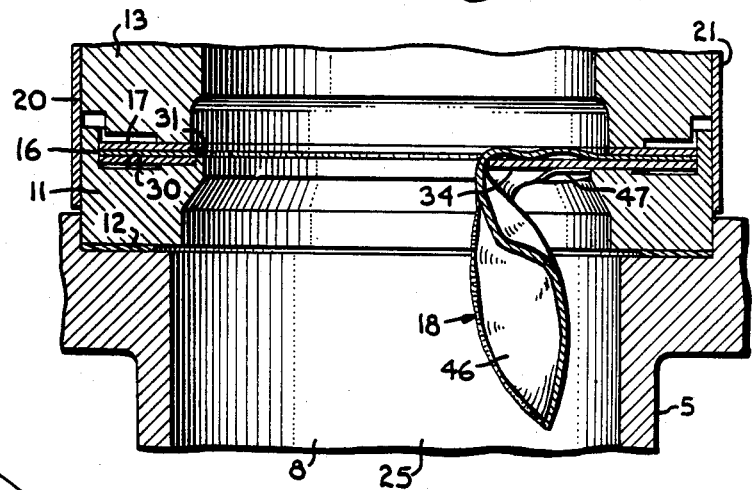
FIG. 7 is a fragmentary cross-sectional view of the rupture disc assembly shown in FIG. 1 after rupture of the rupture disc.
Figure 8:
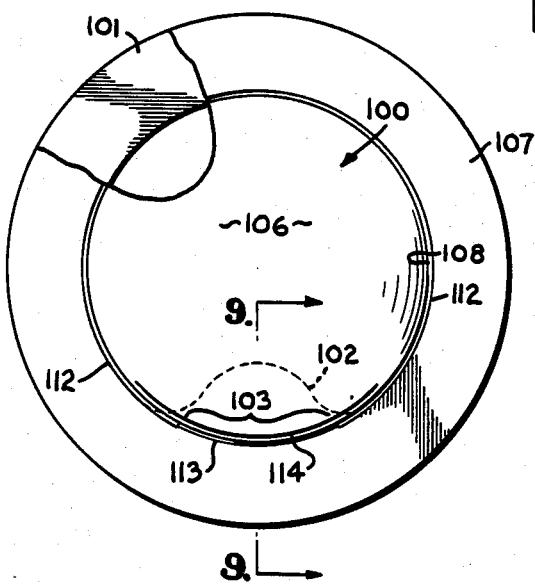
FIG. 8 is a top plan view of a first modified rupture disc and support ring therefor for use in conjunction with the rupture disc assembly of FIG. 1, with portions broken away to show the support ring in greater detail.

FIG. 4 shows a cross-sectional view including a portion of the transition area 42 having a groove 44 therein and FIG. 3 shows a cross-sectional view of a portion of the transition region 42 which does not include a groove. It is noted that preferably the upstream support ring 17 extends radially outward from approximately the center of the groove 44. In contrast, the support ring 16 extends radially inward of the transition region 42 so as to support the transition region 42 at least in the portion thereof including the groove 44. The support ring 16, as is seen in FIG. 6, includes the arcuate projection 34 which is downstream of and preferably aligned with the tab region 42 such that, when the rupture disc 18 bursts the dome 40 will pivot about the hinge region 42 and engage the arcuate projection 34, as is shown in FIG. 7 wherein the ruptured and somewhat crumpled dome, as indicated by the reference numeral 46, wraps about the projection 34 especially in the area of the edges 47 of the dome 46 that tore from the flange portion 41 but which were adjacent the hinge region 42. The projection 34 is arcuate along its radially inward edge 48. The arcuate projection 34 has radially outward ends thereof 49 and 50 which include an arc therebetween which is generally similar to but slightly larger than the arc encompassed by the tab region 45.

Figure 9:
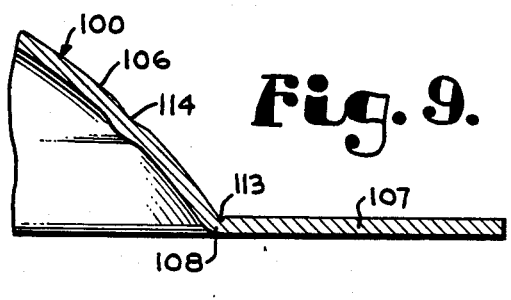
FIG. 9 is an enlarged fragmentary cross-sectional view of the first modified rupture disc taken along line 9—9 of FIG. 8.

Shown in FIGS. 8, 9, 10 and 11 is a first modified embodiment of the present invention including a first modified rupture disc 100 and support ring therefor 101 which are suitable for use in the assembly 1 as alternative replacements for the disc 18 and support ring 16 respectively. The support ring 101 is essentially similar to the support ring 16 and includes an arcuate projection 102 which extends radially inward therefrom. The arcuate projection 102 is downstream aligned with a tab region 103 of the disc 100. The disc 100 includes a dome 106 with a radially outward extending flange portion 107 joined by a transition region 108. A partially circumferential, relatively deep groove 112 extends entirely around the dome 106 except in the tab region 103 wherein there is a very shallow groove 113 compared to the relatively deeper groove 112. An indentation 114 is positioned in the dome as is best shown in FIG. 9. The indentation 114 is approximately centered on the tab region 103 and is spaced closely therefrom. The indentation 114 comprises an elongate dent which is oriented approximately parallel to the transition region 108.

FIGS. 12 and 13 show a second modified disc 130. The disc 130 is similar to the disc 100 except that instead of an elongate indentation 114, as seen in disc 100, the disc 130 has a dimple or dot indentation 132 on the dome 131 thereof. The disc 130 has a flange portion 133 and transition region 134 which are similar to the same features in the disc 100 in the previous embodiment. A tab region 135 is centered to be aligned with the indentation 132.

FIG. 14 shows a third modified rupture disc 140 according to the present invention including a dome 141 having an elongate indentation 142 therein. The disc 140 is similar to the disc 100 except for the placement and size of the indentation 142 as compared to the indentation 114.

FIG. 15 shows a fourth modified rupture disc 150 according to the present invention. Disc 150 includes a dome 151, a flange portion 152, and a transition region 153 between the flange portion 152 and the dome 151. A tab region 154 is specifically shown, and this disc 150 has a non-tab region (not shown) in the transition region 153 similar to that of the disc 100. The disc 150 also has a transition region with a slightly increased radius of curvature generally indicated by the arrow 155 in a portion of the transition region 153 as compared to the remainder thereof and specifically in the tab region 154.

Figure 29:
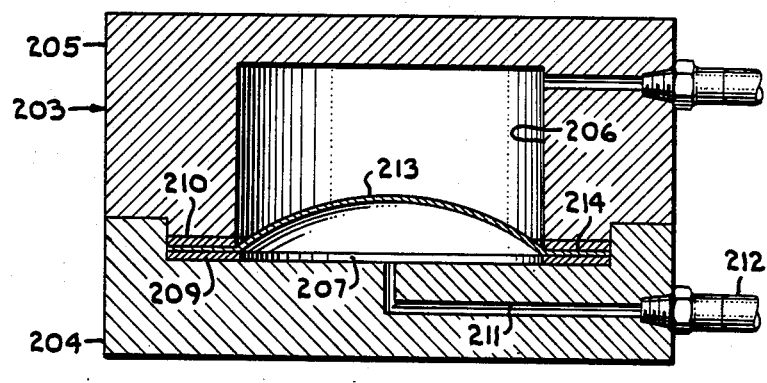
FIG. 29 is a cross-sectional view of a rupture disc during a step in the process of manufacture thereof and shown in a rupture disc bulge forming apparatus suitable for use alternatively with the ringlet sets shown in FIGS. 27a, 27b and 27c for the formation of an indentation on the rupture disc.

FIGS. 16 through 26 illustrate different steps in the method of manufacture of a rupture disc of the present invention and illustrate various structures utilized in the manufacture of the present invention. FIG. 16 illustrates a planar sheet of metal or blank 200 from which a rupture disc, such as the previously described disc 18, is manufactured. FIG. 29 illustrates an apparatus 203 for forming a rupture disc from such a blank 200.

The apparatus 203 includes a lower member 204 and an upper member 205 which generally mate together so as to define a chamber 206 therebetween. A first sealing ring 209 is placed in a bottom of the chamber 206 followed by the planar sheet of metal 200 followed by at least one additional bulge forming ring 210. Preferably the outer diameter of the rings 209 and 210 and the blank 200 are approximately the same as the inner diameter of the chamber 206 where they interengage. A hydraulic fluid supply passage 211 communicates with a suitable source of hydraulic fluid through a hydraulic hose 212 with a lower portion 207 of the chamber 206, which chamber portion 207 is shown below the blank 200, to be pre-bulged into a domed rupture disc 213. It is noted that the blank 200 is not shown in FIG. 29 but the blank 200 occupies the same region as a flange portion 214 of the disc 213 as well as the region surrounded by the flange portion 214. After the blank 200 is placed in the apparatus 203, fluid is forced into the chamber portion 207 through the passage 211 while the disc blank 200 is securely held about the edges thereof in position so as to pre-bulge into the disc 213. FIG. 17 shows the disc 213 and the upper ring 210. As shown in FIG. 21, a lower inner radial edge 218 of the ring 210 defines an outer boundary or periphery 219 of a dome 220 of the disc 213. It is noted that the edge 218 is a sharp edge formed by sides of the ring 210 which meet at almost 90 degrees with respect to one another. FIG. 22 shows a view which is similar to FIG. 21 except it is taken at another location along the ring 210 whereat the sides of the ring 210 join in a rounded edge 222 which defines the limits or periphery 223 of the dome 220 at that location. A transition region 224 shown in FIG. 22 has a larger radius of curvature at that location than a transition region 225 shown in FIG. 21. This change in radius and/or slope is similar to the concept previously shown in and described for FIG. 15.

Figure 27A:
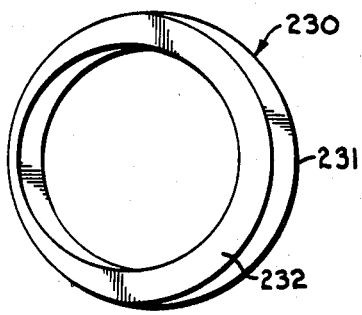
FIG. 27a is a top plan view of a dome forming a ringlet set for use in a step in the process of forming a reverse buckling rupture disc with an indentation on a dome thereof.
Figure 28A:
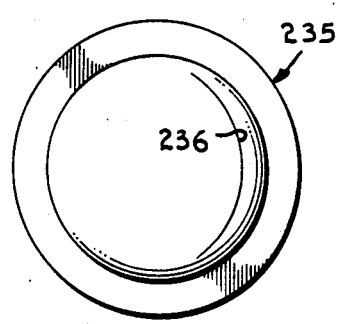
Figure 30:
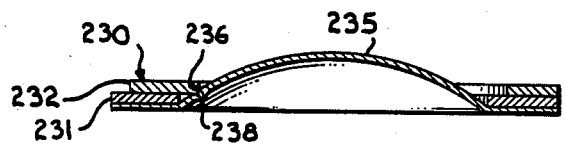

Shown in FIG. 27a is an alternative ring set 230 for use in conjunction with the apparatus 203 in place of the ring 210. The set 230 shown in FIG. 30 in conjunction with a disc 235 includes a lower forming ring 231 similar to the ring 210 and an upper indentation ring 232 which has a similar internal diameter to the ring 231 but is positioned somewhat eccentrically thereto. The ring set 230 is utilized in the production of the rupture disc 235, shown in FIG. 28a, having an indentation 236 thereon produced by a radially inward and lower edge 238 of the indentation ring 232 engaging the disc 235 as same is pre-bulged. An outer portion of the ring 232 is removed so that the ring set 230 has an overall outer diameter approximating the diameter of the disc 235 so that the ring set 230 and disc will set in the apparatus 203 without lateral slippage therebetween when the disc 235 is being bulged.

Figure 27B:
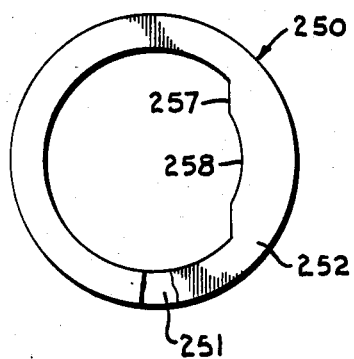
FIG. 27b is a view similar to FIG. 27a and illustrates a first modified dome formation ringlet set for forming a first modified indentation on a rupture disc during a process in the manufacture thereof.
Figure 28B:
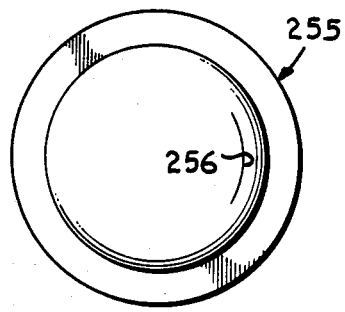
FIG. 28b is a view similar to FIG. 28a showing a sixth modified rupture disc having an indentation formed thereon by the ringlet set shown in FIG. 27b.

FIG. 27b shows a second offset ring set 250 having a lower forming ring 251 which is generally concentric with an upper indentation ring 252. FIG. 28b shows a rupture disc 255 manufactured in the apparatus 203 wherein the ring set 250 has been substituted for the ring 210. An indentation 256 is formed on the rupture disc 255 by a radially inward extending projection 257 having an inner surface 258 with a lower edge which engages the disc 255 during pre-bulging and produces the indentation 256. The surface 258 is arched to approximate the arc of the disc 255 where they engage and includes linear feathering on opposite sides of the surface 258.

Figure 27C:
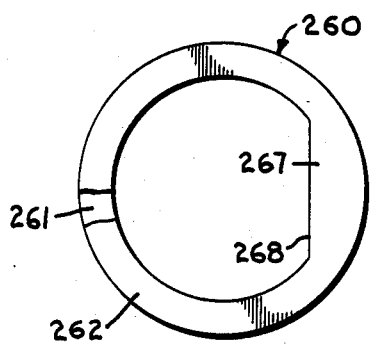
FIG. 27c is a view similar to FIG. 27a and shows a second modified indentation formation ringlet set for forming a second modified indentation on a rupture disc.
Figure 28C:
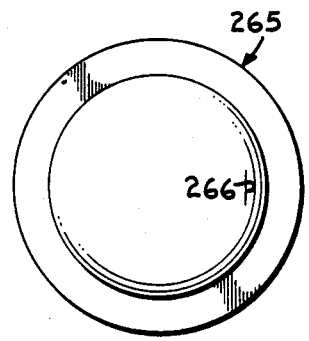
FIG. 28c is a view similar to FIG. 28a showing a seventh modified rupture disc having an indentation formed thereon by the ringlet set shown in FIG. 27c.

FIG. 27c shows yet another ring set 260 having a lower forming ring 261 and a generally concentric upper indentation ring 262. FIG. 28c shows a rupture disc 265 manufactured in the apparatus 203 wherein the ring 210 has been replaced by the ring set 260. The upper indentation ring 262 includes a radially inwardly extending projection 267 generally comprising a chord or a linear joining of the two sides of the ring 262 and having an inner surface 268 with a lower edge which engages a disc 265 (FIG. 28c) during pre-bulging thereof so as to form an indentation 266 therein.

After pre-bulging and indenting (where done) in the apparatus 203, rupture discs, such as the disc 300 in FIG. 23, which were manufactured in the apparatus 203 are removed. The disc 300 has an indentation 301 thereon and a tab region 302 located in close association to the indentation 301. The disc 300 is then joined with an upstream support ring 311 and a downstream support ring 310. The rings 310 and 311 are similar to rings 16 and 17 shown in FIG. 1. The downstream ring 310 includes an arcuate projection 312 which is aligned to be centered relative to the tab region 302 and the indentation 301. The disc 300 and the rings 310 and 311 are then preferably joined together by welding or the like as shown in FIGS. 24 and 26 after groove 314 is formed in a transition region 315 thereof.

Figure 18:
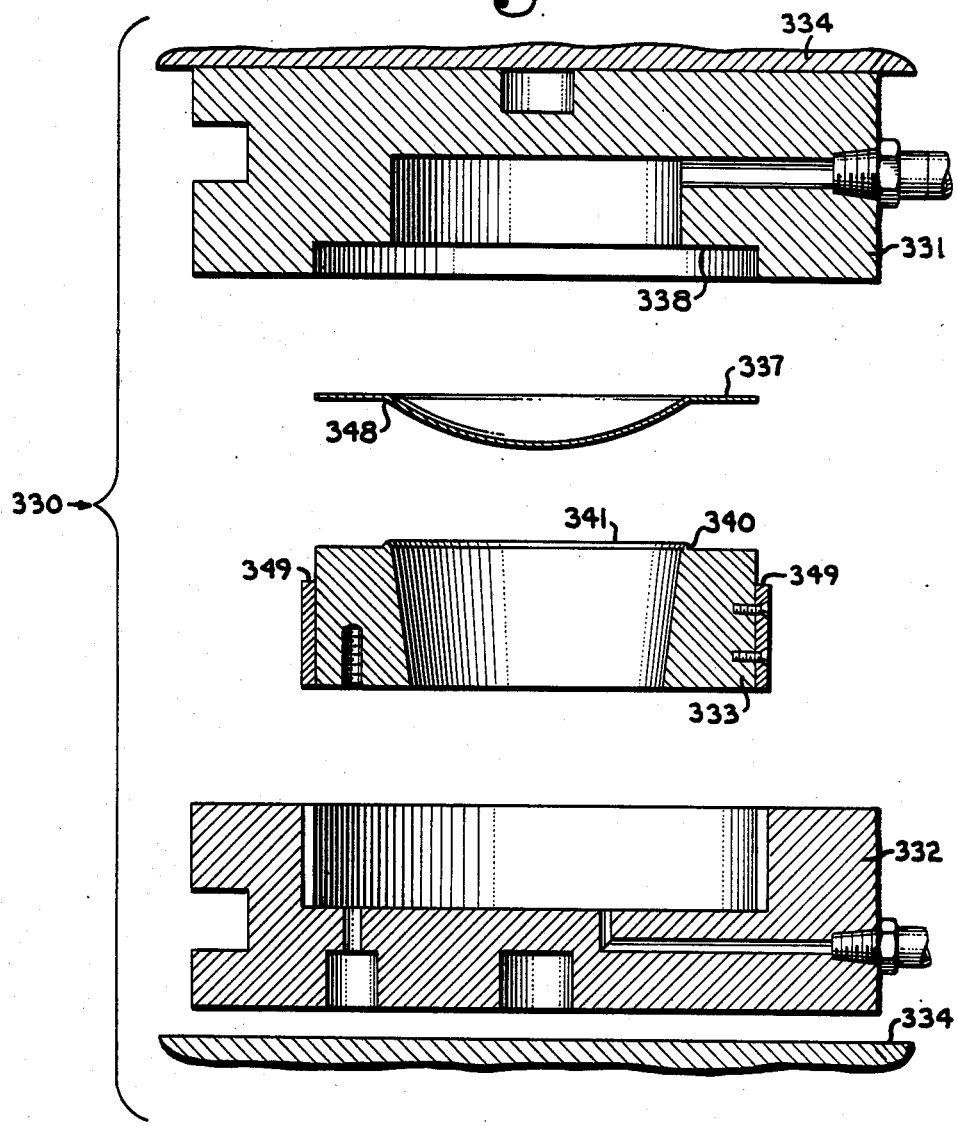
FIG. 18 is an exploded cross-sectional view of a rupture disc and a grooving apparatus having a knife blade die for placing a circumferential groove in the transition area between flange and dome portions of the disc.
Figure 19:
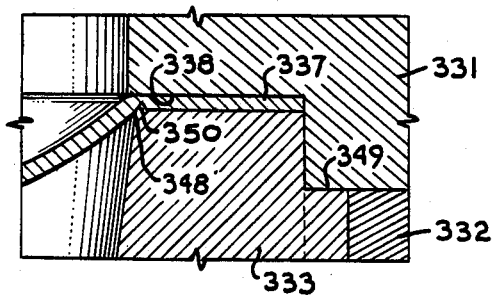
FIG. 19 is an enlarged fragmentary cross-sectional view of the apparatus and disc of FIG. 18 showing the disc during the actual process step of forming a groove in the transition area thereof.
Figure 20:
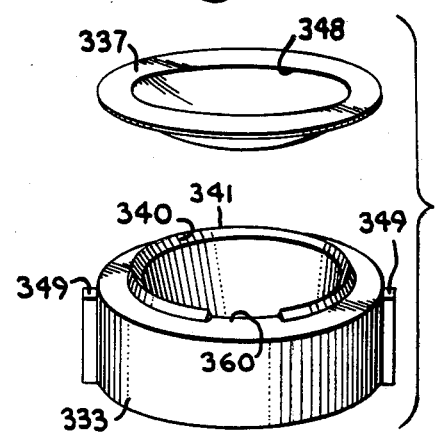
FIG. 20 is an exploded perspective view at a reduced scale of a rupture disc and the die from the grooving apparatus shown in FIG. 18 following etching of the disc in the transition area.

A grooving apparatus 330 for performing the grooving process is shown in FIGS. 18, 19 and 20. The apparatus 330, as shown in FIG. 18, includes an upper holder member 331, a lower holder member 332 which mates with the upper holder member 331, a die or knife holding member 333, and pressure exerting means such as the partially shown hydraulic press mechanism 334. A pre-bulged disc 337 is placed in a seat 338 in the upper holder member 331. The knife holding member 333 includes a circular knife 340 having an upper edge 341 and having a radius slightly larger but approximately the same radius as the inner edge of a transition area 348 of the disc 337. The knife edge 341 is placed in engagement with the disc transition area 348, as shown in FIG. 19, and pressure is applied by the press 334. Stops 349 on the knife holding member 333 engage the upper holder 331 to facilitate proper grooving of the disc 337 so that the groove 350, as seen in FIG. 19, has a proper depth associated therewith. The knife 340 shown in FIG. 20 is only partially circumferential and includes a sector 360 in which the knife 340 is omitted to leave a portion of the disc transition area 348 ungrooved. The stops 349 are removable from the knife holding member 333 to facilitate alternative use of the other stops specifically designed for other particular depths and/or other disc thicknesses.

Figure 31:
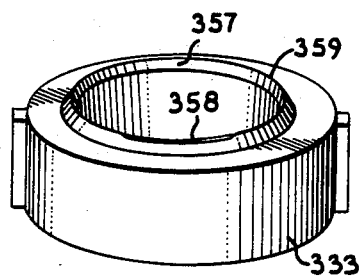
FIG. 31 is a perspective view of a modified grooving apparatus knife holding member similar to the die of FIG. 20.

Alternatively, the knife 340 can be replaced by a completely circumferential knife member or also, alternatively, by a knife member 357, as shown in FIG. 31, which is completely circumferential but for a portion 358 of the edge 359 of the knife blade which has been further rounded or had a portion of the edge removed so as to limit the depth of a groove in that region where the portion 358 engages the disc 337. The sides of the knife in FIG. 19 diverge from the edge 341 at an angle of approximately 60 degrees relative to one another and the cutting or grooving edge 359 has a radius of approximately 0.005 inches.

Figure 25:
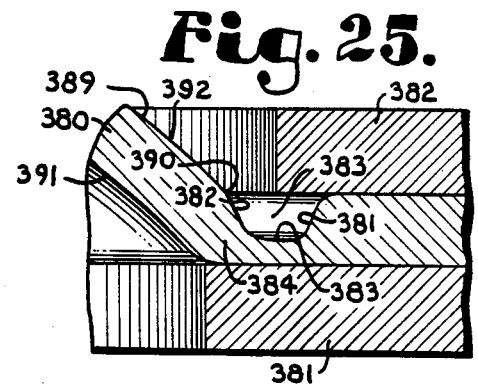
FIG. 25 is a fragmentary cross-sectional view similar to that of FIG. 24 but further enlarged in comparison and showing a rupture disc and support ring for use in the assembly of FIG. 1 and illustrates a groove in the transition region between the dome and flange area thereof.

FIG. 25 shows an enlarged section of a rupture disc 380 having a lower support ring 381 and an upper support ring 382 associated therewith. The disc 380 has had a groove 383 according to the present invention placed in a transition region 384 thereof. The groove 383 was produced by a method similar to the groove 350 formed in the process shown in FIGS. 18 through 20. The groove 383 includes side walls 381 and 286 which diverge with respect to each other and at about 30 degrees each to an axis or vertical line bisecting the groove 383 and are joined by a connecting surface 387 having a radius of approximately 0.005 inches. The disc 380 has a dome 389, a periphery 390, a concave side 391 and a convex side 392.

It is to be understood that while certain forms of the present invention have been illustrated and described herein, it is not to be limited to the specific forms or arrangement of parts described and shown.

What is claimed and desired to be secured by Letters Patent is as follows:

1. In a reverse buckling rupture disc having a preselected reverse buckling pressure and having a pre-bulged dome including a crown at an apex of said dome and a periphery spaced radially from said crown and said dome having a concave side and a convex side, the improvement comprising:
    (a) an initial failure directing indentation formed in said dome between said periphery and said crown; said dome being substantially free of indentations except for said failure directing indentation;
    (b) said failure directing indentation being nonsymmetrically positioned on said dome; and
    (c) the thickness of said dome at said failure directing indentation being substantially equal to the thickness of a portion of the dome surrounding said failure directing indentation;
    (d) whereby when said buckling pressure is applied to said convex side of said dome, said dome initially buckles along an arc extending between said crown and said periphery and passing through said failure directing indentation.

2. The disc according to claim 1 and including:
    (a) a flange surrounding said dome;
    (b) a transition region defined between said dome and said flange;
    (c) means defining a tear region along a first portion of said transition area whereby said dome separates from said flange along said tear region during rupture of said disc;
    (d) a tab area comprising the remainder of said transition region not defined as said tear region, said tab area remaining integral to maintain the connection of said dome to said flange during rupture of said disc; and
    (e) said indentation being located on said dome between said tab area and said crown.

3. The disc according to claim 2 wherein:
    (a) said indentation is substantially spaced from both said crown and said dome periphery.

4. The disc according to claim 2 wherein:
    (a) said indentation is elongate, extends for an arc of less than 30 degrees, and is deepest at a central location therealong; and
    (b) said central location of said indentation is located on said dome along an arc on said dome extending through a center of said tab area and said crown.

5. The disc according to claim 2 wherein:
    (a) said indentation is elongate and extends circumferentially to said crown in substantially parallel spaced relation to said transition region along the entire length of said indentation.

6. The disc according to claim 5 wherein:
    (a) said indentation is spaced approximately 0.06 inches from said transition region.

7. The disc according to claim 2 wherein:
    (a) said indentation is a dimple on said dome.

8. The disc according to claim 1 wherein:
    (a) said indentation is elongate and is in substantially parallel spaced relation to said dome periphery; and
    (b) said indentation is spaced from said crown.

9. The disc according to claim 8 wherein:
    (a) said indentation extends for an arc of less than 30 degress.

10. The disc according to claim 1 wherein:
    (a) said indentation is a dimple spaced from both said crown and said periphery of said dome.

11. A reverse buckling rupture disc comprising:
    (a) a centrally located pre-bulged dome portion having a radially outward periphery and a crown at an apex of said dome; said dome portion having a concave side and a convex side; said disc reverse buckling upon application of a preselected pressure to said dome portion convex side;
    (b) a flange joined to and surrounding said dome and extending radially outwardly therefrom;
    (c) a transition region between said dome and said flange;
    (d) a groove in said transition area;
    (e) a tab area joining said dome and said flange and being defined by said groove having a reduced depth in said tab area as compared to a remainder of said groove; and
    (f) failure initiating means on said dome comprising an indentation having a thickness approximately equal to a thickness associated with a remainder of said dome and being positioned between said tab area and said crown to effect initial failure of said disc during rupture thereof between said tab area and said crown; said dome having a substantially smooth arcuate surface except for said failure initiating means;
    (g) whereby when said preselected pressure is applied to said dome convex side, said dome portion first buckles along an arc on said dome portion between said tab area and said crown and passing through said failure initiating means, thereafter said buckling travels across said dome portion to opposite said failure initiating means such that said dome portion reverses and passes through said flange opposite said failure initiating means and said dome portion tears from said flange along a substantial length of said groove and remains attached to said flange in said tab area.

12. The disc according to claim 11 wherein:
    (a) the depth of said groove in said transition region excluding said tab area is within a range of about 42% to 75% of the depth thickness of the disc adjacent said groove.

13. The disc according to claim 11 wherein:
    (a) said groove in said transition region excluding said tab area has a depth of approximately 2/3 of the thickness of the disc adjacent to said groove.

14. The disc according to claim 11 wherein:
    (a) said groove is totally discontinuous within the portion of said transition region associated with said tab area.

15. The disc according to claim 11 including:
    (a) mounting means for mounting said disc in a vent system; and
    (b) said mounting means including a projection extending radially inwardly at a location in downstream alignment with said tab area whereby when said rupture disc ruptures, said dome rotates about said tab area and engages said projection.

16. The disc according to claim 15 wherein:
(a) said projection has a radially inward surface which is arcuate in shape.

17. The disc and assembly according to claim 16 wherein:
(a) said radially inward surface is generally semicircular.

18. A reverse buckling rupture disc comprising:
(a) a centrally located pre-bulged dome portion having a radially outward periphery and a crown at an apex of said dome; said dome portion having a concave side and a convex side; said disc reverse buckling upon application of a preselected pressure to said dome portion convex side;
(b) a flange joined to and surrounding said dome and extending radially outwardly therefrom;
(c) a transition region between said dome and said flange;
(d) a groove in said transition region;
(e) a tab area joining said dome and said flange and being defined by said groove having a reduced depth in said tab area as compared to a remainder of said groove;
(f) failure initiating means positioned between said tab area and said crown to effect initial failure of said disc during rupture thereof between said tab area and said crown; said dome having a substantially smooth arcuate surface except for said failure initiating means;
(g) said failure initiating means comprising an indentation in said dome spaced from and between both said tab area and said crown; and
(h) the thickness of said dome at said indentation being approximately the same as the thickness of said dome over the remainder thereof;
(i) whereby when said preselected pressure is applied to said dome convex side, said dome portion first buckles along an arc on said dome portion between said tab area and said crown and passing through said failure initiating means, thereafter said buckling travels across said dome portion to opposite said failure initiating means such that said dome portion reverses through said flange opposite said failure initiating means and said dome portion tears from said flange along a substantial length of said groove and remains attached to said flange in said tab area.

19. The disc according to claim 18 wherein:
(a) said indentation is elongate.

20. The disc according to claim 19 wherein:
(a) said indentation is substantially parallel to said transition region along the entire length of said indentation.

21. The disc according to claim 20 wherein:
(a) said indentation extends over an arc of less than 30 degrees.

22. The disc according to claim 18 wherein:
(a) said indentation is a dimple.

23. A rupture disc assembly comprising:
(a) a reverse buckling rupture disc having a pre-bulged dome with a radially outward periphery and a crown at an apex of said dome, a flange connected to the periphery of said dome and extending radially outwardly therefrom, and a transition region between said dome and said flange; said dome having a concave surface and a convex surface;
(b) mounting means for securing said disc in a vent such that the disc prevents passage of fluid through the vent until rupture of the disc;
(c) said disc including a tab area defined thereon in a portion of the transition region and a tear area in a remainder of the transition region; said disc tearing in said tear area upon rupture of the disc and said tab area remaining untorn upon rupture of the disc so as to maintain said dome connected to said flange after rupture of said disc; and
(d) an indentation positioned on said dome in spaced relationship to both said dome periphery and said crown and having a thickness approximately the same as a thickness associated with said dome other than at said indentation; said indentation being positioned on said dome in an unsymmetrical manner so as to be generally aligned between said tab area and said crown; said dome convex surface being smooth and free of substantial deformations except for said indentation;
(e) whereby upon buckling of said disc, said dome initially buckles near said tab area due to the placement of said indentation with the result that said dome opposite said tab area experiences a whiplash effect and is initially torn from said flange and such that said dome remains attached to said flange at said tab area after rupture of said disc.

24. The assembly according to claim 23 including:
(a) a groove in said transition region; said groove having a sector with a depth associated therewith; said sector being continuous and coextensive with said transition region outside of said tab area.

25. The assembly according to claim 24 wherein:
(a) said sector of said groove has a depth of between 40% and 75% of the thickness of said disc adjacent to said groove.

26. A rupture disc assembly comprising:
(a) a reverse buckling rupture disc having a pre-bulged dome with a radially outward periphery and a crown at an apex of said dome, a flange connected to the periphery of said dome and extending radially outwardly therefrom, and a transition region between said dome and said flange; said dome having a concave surface and a convex surface;
(b) mounting means for securing said disc in a vent such that said disc prevents passage of fluid through the vent until rupture of said disc;
(c) said disc including a tab area defined thereon in a portion of said transition region and a tear area in a remainder of said transition region; said disc tearing in said tear area upon rupture of the disc and said tab area remaining untorn upon rupture of the disc so as to maintain said dome connected to said flange after rupture of said disc;
(d) an indentation positioned on said dome in spaced relationship to both said dome periphery and said crown; said indentation being positioned on said dome in an unsymmetrical manner so as to be generally aligned between said tab area and said crown; said dome convex surface being smooth and free of substantial deformation except for said indentation; and
(e) said indentation is elongate, extends over an arc of less than 30 degrees, and is generally equally spaced along the entire length thereof from said transition region;
(f) whereby upon buckling of said disc, said dome initially buckles near said tab area due to the placement of said indentation with the result that said dome opposite said tab area experiences a whiplash effect and is initially torn from said flange and such that said dome remains attached to said flange at said tab area after rupture of said disc.

* * * * *